US012627723B2

(12) United States Patent
Li et al.

(10) Patent No.: US 12,627,723 B2
(45) Date of Patent: May 12, 2026

(54) MEDIA STREAMING ENDPOINT

(71) Applicant: Intel Corporation, Santa Clara, CA (US)

(72) Inventors: Yadong Li, Portland, OR (US); Changliang L. Wang, Bellevue, WA (US); Bradley A. Burres, Newton, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/712,059

(22) Filed: Apr. 1, 2022

(65) Prior Publication Data

US 2022/0224746 A1     Jul. 14, 2022

(51) Int. Cl.
| | |
|---|---|
| *H04L 65/70* | (2022.01) |
| *H04L 43/0823* | (2022.01) |
| *H04L 65/65* | (2022.01) |

(52) U.S. Cl.
CPC .......... *H04L 65/70* (2022.05); *H04L 43/0847* (2013.01); *H04L 65/65* (2022.05)

(58) Field of Classification Search
CPC ..... H04L 65/70; H04L 43/0847; H04L 65/65; H04L 65/1069; H04L 65/612; H04L 65/80; H04L 41/145; H04L 41/16; H04L 43/20; H04L 43/087; H04L 43/0876; H04L 65/762; H04L 65/764; G06F 2213/3808
See application file for complete search history.

(56) References Cited

U.S. PATENT DOCUMENTS

| | | | | |
|---|---|---|---|---|
| 10,672,098 | B1 * | 6/2020 | Chemparathy | .......... G09G 5/39 |
| 2008/0126812 | A1 * | 5/2008 | Ahmed | .................. H04N 19/61 |
| | | | | 713/189 |
| 2014/0297799 | A1 * | 10/2014 | Gordon | .............. H04N 21/2402 |
| | | | | 709/217 |
| 2019/0356701 | A1 * | 11/2019 | Prabhu | ................ H04L 65/4061 |
| 2019/0373040 | A1 * | 12/2019 | Grubbs | .................. H04L 65/65 |
| 2020/0177660 | A1 * | 6/2020 | Connor | ................. H04L 69/326 |
| 2020/0230505 | A1 * | 7/2020 | van der Laan | ....... A63F 13/352 |
| 2020/0382832 | A1 * | 12/2020 | Wang | ..................... H04N 21/44 |
| 2021/0076016 | A1 * | 3/2021 | Sviridenko | .............. H04N 9/64 |
| 2021/0203704 | A1 | 7/2021 | Pohl | |
| 2022/0028172 | A1 * | 1/2022 | Yip | ....................... H04L 65/756 |

OTHER PUBLICATIONS

Burman, Bo et al., "Using Simulcast in Session Description Protocol (SDP) and RTP Sessions", RFC: 8853, https://www.rfc-editor.org/rfc/rfc8853.html, Jan. 2021, 25 pages.
(Continued)

*Primary Examiner* — Schquita D Goodwin
(74) *Attorney, Agent, or Firm* — Compass IP Law PC

(57) ABSTRACT

Examples described herein relate to a network interface device that includes circuitry to: receive a request to perform offloaded media encoding and packetization prior to transmission of the media to a receiver, wherein the media comprises video and audio; perform encoding of the media; perform packetization of the encoded media into one or more packets based on Real-time Transport Protocol (RTP) protocol; and cause transmission of the one or more packets to the receiver.

20 Claims, 16 Drawing Sheets

(56) References Cited

OTHER PUBLICATIONS

Scop, Erez, "Streaming Everything with NVIDIA Rivermax", Technical Blog, https://developer.nvidia.com/blog/streaming-everything-with-rivermax/, May 4, 2021, 2 pages.

WebTransport, "Web Transport/WebCodecs interaction (copies) #231", https://github.com/w3c/webtransport/issues/231, Jan. 2023, 6 pages.

Extended European Search Report for Patent Application No. 23155654.9, Mailed Aug. 22, 2023, 9 pages.

European First Office Action, (EP Exam Report Article 94(3) EPC), for Patent Application No. 23155654.9, Mailed May 8, 2025, 6 pages.

* cited by examiner

RECEIVE CONFIGURATION TO PERFORM OFFLOADED FORMATION OF
STREAMED MEDIA AND PACKETIZATION OF STREAMED MEDIA
602

RECEIVE REQUEST PERFORMANCE OF ENCODING AND PACKETIZATION OF
STREAMED MEDIA
604

INDICATE COMPLETION OF REQUEST TO PERFORM ENCODING AND
PACKETIZATION OF STREAMED MEDIA
606

RECEIVE CONFIGURATION TO PERFORM OFFLOADED DE-PACKETIZATION
AND RECONSTRUCTION OF STREAMED MEDIA
650

PERFORM DE-PACKETIZATION, APPLY JITTER BUFFER, AND DECODE MEDIA
652

INDICATE AVAILABILITY OF MEDIA TO PROCESS
654

MEDIA STREAMING ENDPOINT

BACKGROUND

Cloud-based media rendering, gaming, virtual reality/ augmented reality (VR/AR) and Metaverse (e.g., virtual reality) generate and transmit media, including video and audio, to client devices for playback by users. In a cloud environment, central processing units (CPUs) and graphics processing units (GPUs) perform video and audio frame processing, including video frame segmentation, realtime transport protocol (RTP) packetization, and packet pacing of transmitted packets. Memory bandwidth (BW) to access memory for store-and-forward operations and data copying can be overutilized and reduce a rate at which video and audio can be transmitted or processed after receipt. In addition, CPU cycles that could be used for other tasks are spent to perform video and audio processing.

DETAILED DESCRIPTION

Overutilization of CPU or processor resources from media processing and overutilization of memory bandwidth and interconnect bandwidth can increase latency of transmitting media or providing media to a user of a client device. At least to attempt to reduce latency arising from use of CPUs and GPUs to process media prior to transmission and/or after receipt, a media streaming endpoint (EP) can perform offloaded tasks related to media stream transmission including media frame segmentation and RTP packetization and/or media stream reconstruction including reassembly and RTP de-packetization. The media streaming EP can be accessible as a network interface device. The media streaming EP can be configured to perform offloaded tasks related to media stream transmission and reconstruction by an application program interface (API), configuration file, writes to a register, or other communications.

In some examples, in connection with media transmission, processes such as media streaming applications can configure the media streaming EP with one or more of: initialization specifying a protocol to apply to transmit media, a request to encode video and a frame address, video and/or audio encoding type, and destination Internet Protocol (IP) address. In connection with transmission of media, the media streaming EP can indicate to the process, that requested offload of media stream transmission and reconstruction, completion of transmission of a frame or stream, or indicate if an error occurred such as frame or stream transmission did not complete.

In some examples, in connection with video receipt and reconstruction, processes such as media streaming applications can configure the media streaming EP with one or more of: initialization specifying protocol applied to process received media, protocol applied to transmit the media, a request to decode video and/or audio, video and/or audio decoding protocol to apply, or destination memory address to store decoded video and/or audio. In connection with receipt of media, the media streaming EP can indicate to the process, that requested offload of media stream transmission and reconstruction, completion of processing of a frame or stream and destination address.

The media streaming EP can potentially reduce use of host memory bandwidth consumption in connection copying of media data for encoding and segmenting media or decoding and reconstructing media. The media streaming EP can potentially free the CPU and/or GPU to perform tasks other than media streaming transmission and/or reconstruction. The media streaming EP can potentially reduce latency of media transmission and reconstruction. System power consumption can be reduced by offloading media streaming and reconstruction to the media streaming EP.

Figure 1A:
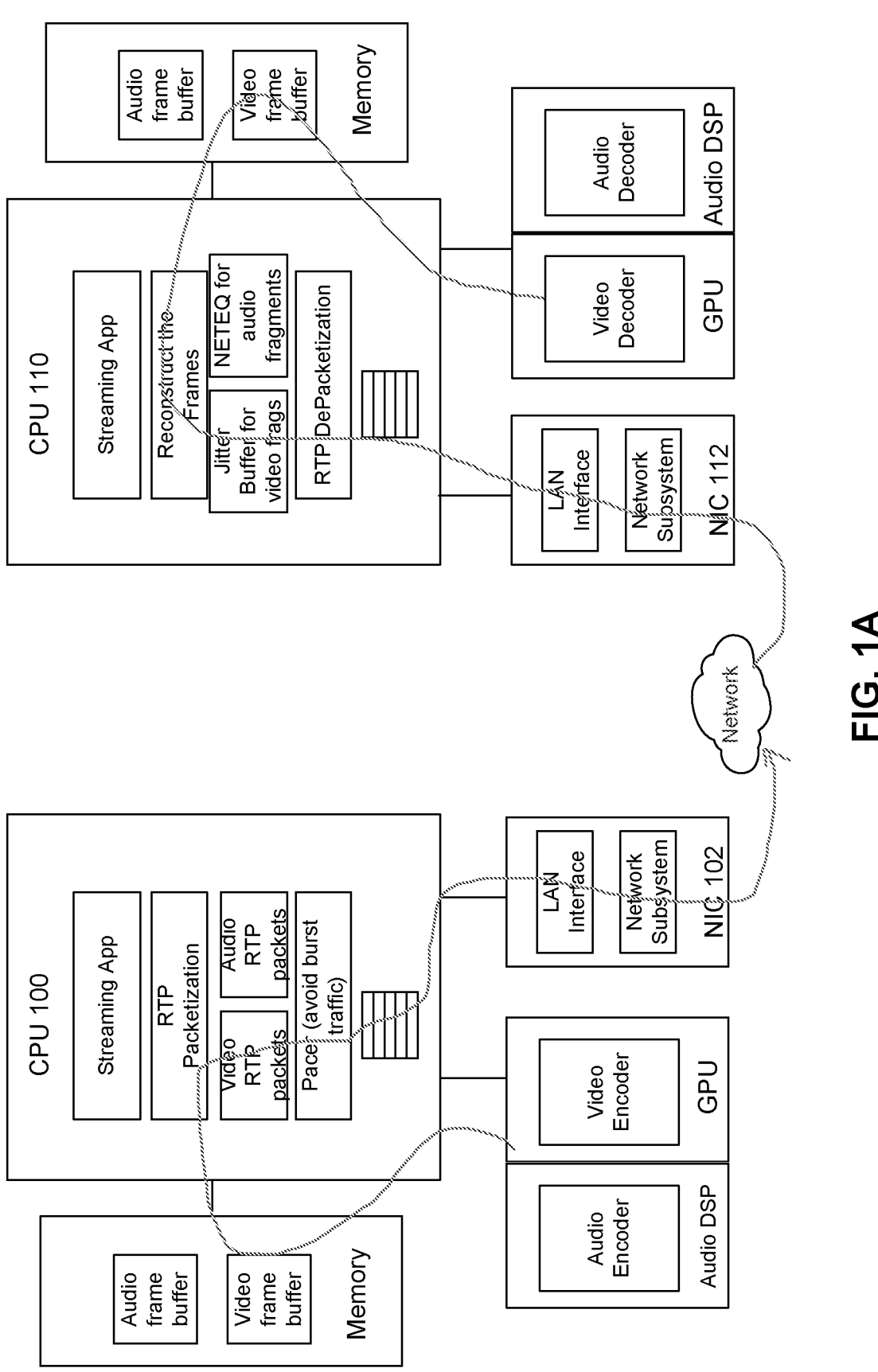
FIG. 1A illustrates an example of a media streaming flow.

FIG. 1A illustrates an example of a media streaming flow. At a sender system, a host CPU 100 can execute a streaming application and networking stack. The streaming application can communicate with a software development kit (SDK) to identify a memory location of a video frame. A video frame can include pixel data of a frame of video. The streaming application can generate video and audio for storage into respective video frame buffers and audio frame buffers allocated in host memory. The GPU can copy, by direct memory access (DMA), video frames from the host memory for encoding and save the encoded frames in the host memory buffer. The networking stack can segment encoded video frames into RTP packets. Encoded video can be copied from user space to kernel space for RTP and TCP protocols by a Linux kernel. The networking stack can perform packet transmit pacing. NIC 102 can transmit RTP packets over a network to receiver NIC 112. A network interface controller (NIC) 102 can perform transmission of video frames generated by the application based on RTP.

Receiver NIC 112 can receive RTP packets and copy contents of the packets to a buffer in host memory. CPU 110 can perform RTP depacketization and management of a jitter buffer for RTP video fragments in host memory and management of an audio jitter buffer (NetEq) for audio fragments. A video frame (in compressed format) can be reconstructed using RTP packets from the jitter buffer and corresponding audio can be reconstructed from the NetEq. The reconstructed video frame can be copied (e.g., DMA) by a GPU for decoding. The GPU can decode the compressed video frame for rendering and the decoded video frame is available for display.

Figure 1B:
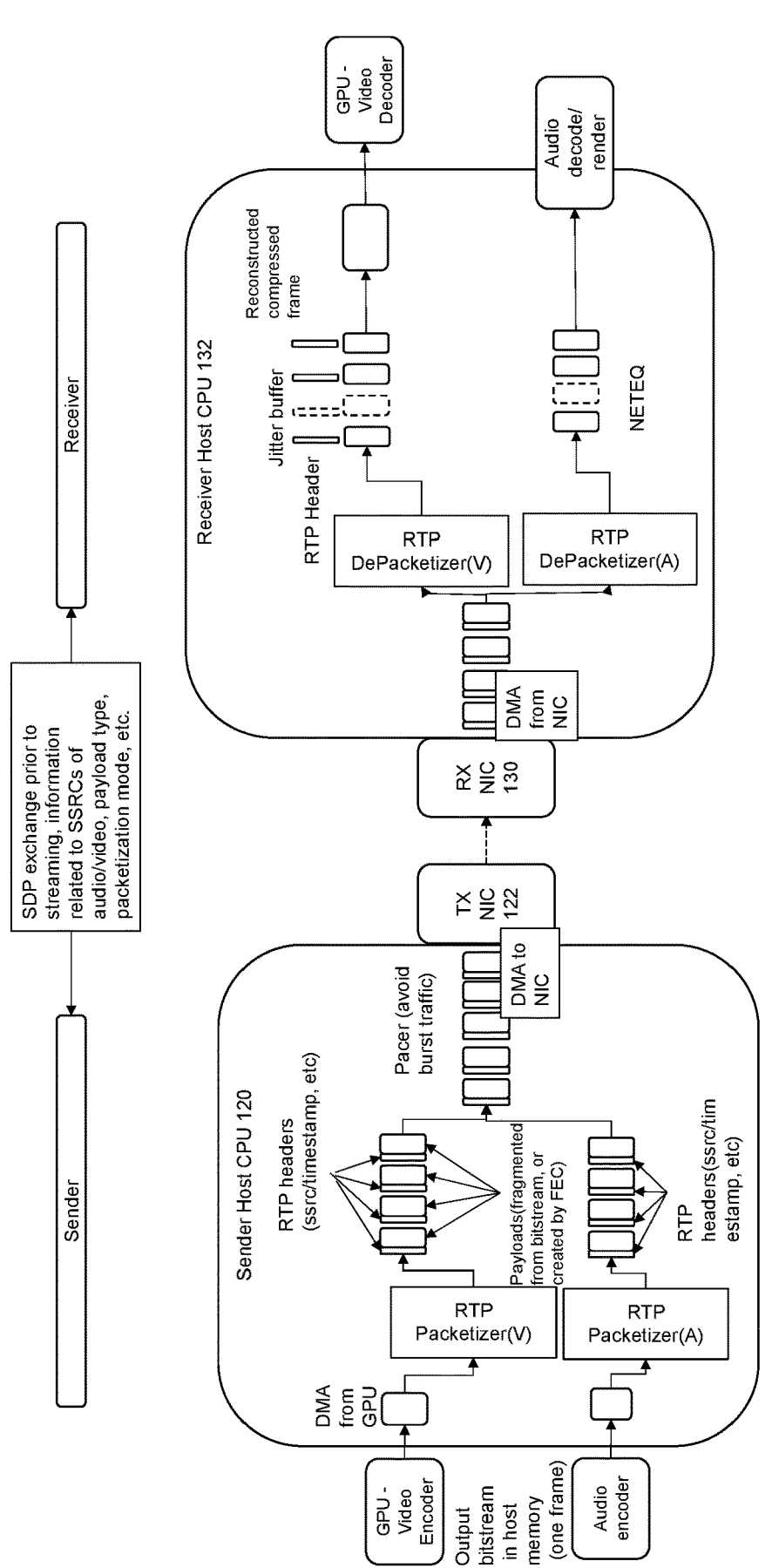
FIG. 1B depicts another example of media streaming and reconstruction.

FIG. 1B depicts example operations of video and audio streaming and reconstruction. Receiver host CPU 132 and sender host CPU 120 can engage in a Session Description Protocol (SDP) exchange of information prior to streaming of media from sender host CPU 120 to receiver host CPU 132. SDP exchange information can include information related to synchronization source (SSRC) of audio or video, payload type, packetization mode, and so forth. An example of SDP exchange is described at least in Request for Comment (RFC) 2327 (1998). Receiver host CPU 132 and sender host CPU 120 can establish a connection for transmission and receipt of RTP packets. In connection with streaming media, a GPU can encode video frames and copy the encoded video frames (e.g., by direct memory access (DMA)) to a video buffer. An audio encoder can copy audio associated with the video frames (e.g., by DMA) to a buffer. Sender host CPU 120 can perform RTP packetization of the video and audio by providing RTP headers with SSRC, timestamp, and other fields. The host CPU can pace transmission of packets RTP packets by a transmitter (TX) NIC 122.

A receiver (RX) NIC 130 can copy (e.g., by DMA) received packets to a destination buffer for processing by a host CPU. Receiver host CPU 132 can perform RTP depacketization of video and audio, apply jitter buffering to the video fragments and audio fragments, and provide reconstructed compressed video frames and audio to respective video decoder and audio decoder. Decoded video and audio can be available for display, processing, or re-transmission.

Figure 2A:
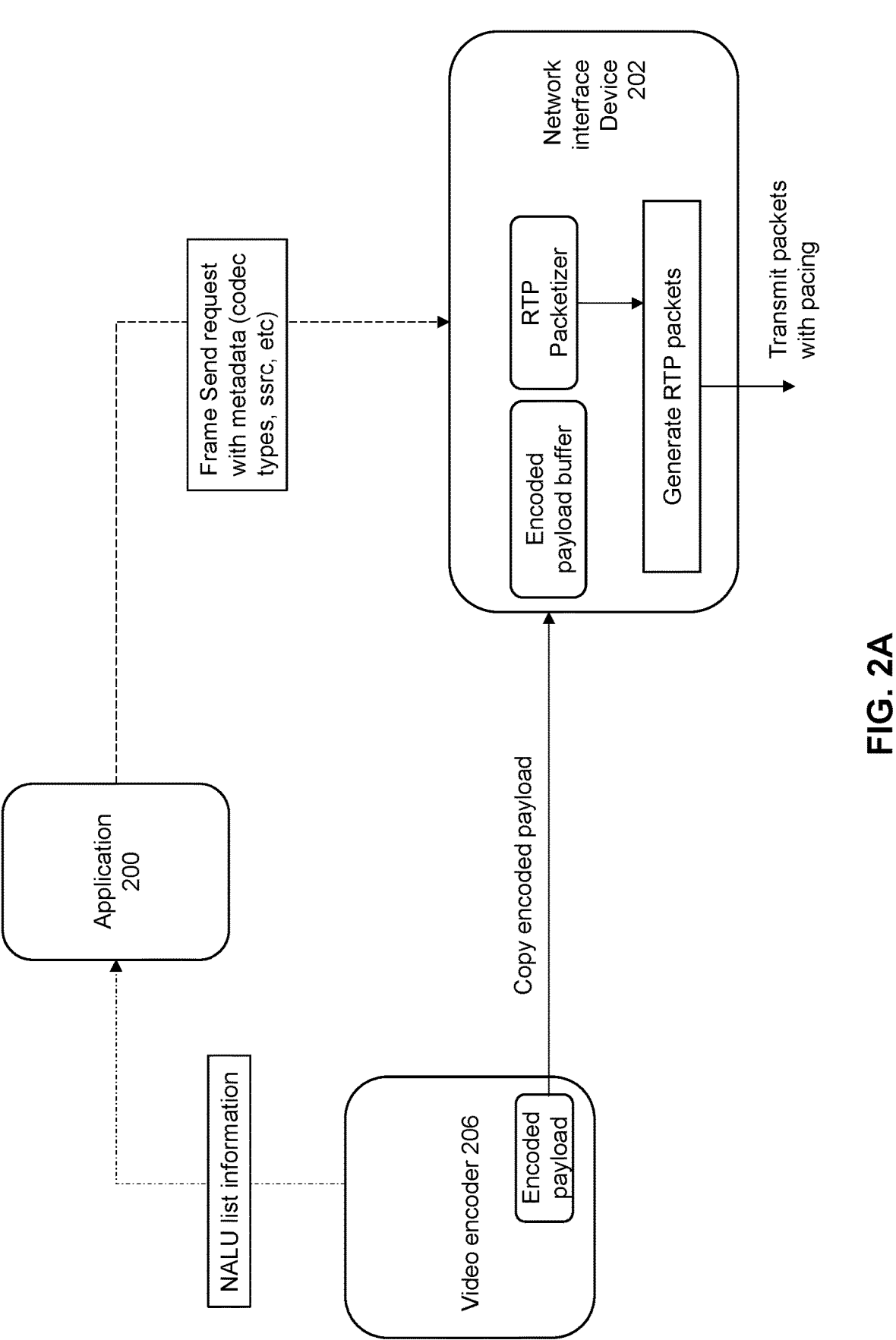
FIG. 2A depicts an example system that can be used by a sender.

FIG. 2A depicts an example system that can be used by a sender to stream video and/or audio. Application 200 can configure network interface device 202 to perform offloaded video transmission by specifying a protocol to apply to transmit streamed media (e.g., RTP or others), media encoding type (e.g., H.264 or others), and source memory address of media data to transmit. For example, media can include content for video conferencing, video, audio, VR, AR, Metaverse content (e.g., avatars, virtual worlds), and so forth. Some streaming protocols allow for control of media playback, recording, or pausing to provide real-time control of media streaming from the server to a client such as video-on-demand (VOD) or media on demand. In some examples, application 200 can generate media as part of a content delivery network (CDN). A CDN can include geographically distributed servers that deliver content, including media to destination devices.

Application 200 can issue a request to network interface device 202 to encode video and a frame address. Application 200 can be implemented as one or more of: microservices, virtual machine (VMs), container, process, thread, or other virtualized execution environment. Network interface device 202 can be accessible to application 200 at least as a Peripheral Component Interconnect express (PCIe) device, PCIe physical device, PCIe virtual function, or virtual device. Network interface device 202 can request a video encoder 206 to encode the media into a stream and to packetize the media stream into one or more packets. In some examples, video encoder 206 can be implemented using one or more of: a GPU, accelerator, field programmable gate array (FPGA), application specific integrated circuit (ASIC), or other circuitry.

The RTP payload format can permit packetization of one or more Network Abstraction Layer Units (NALUs), produced by video encoder 206, in one or more RTP payloads. In accordance with RTP, video encoder 206 can provide, to application 200, NALU list information including metadata, shared frame handle, and so forth. In some examples, media can include encoded video and/or audio. Video encoder 206 can copy one or more encoded media payloads to a payload buffer accessible to network interface device 202. Network interface device 202 can perform segmentation of media, perform packetization of media based on Real-time Transport Protocol (RTP) protocol into one or more packets and add Internet Protocol (IP) and media access control (MAC)

headers. Network interface device 202 can cause transmission of the one or more packets to a receiver network interface device. Network interface device 202 can provide an indication of packet transmission per frame or per stream to application 200.

A flow can be a sequence of packets being transferred between two endpoints, generally representing a single session using a known protocol. Accordingly, a flow can be identified by a set of defined tuples and, for routing purpose, a flow is identified by the two tuples that identify the endpoints, e.g., the source and destination addresses. For content-based services (e.g., load balancer, firewall, intrusion detection system, etc.), flows can be differentiated at a finer granularity by using N-tuples (e.g., source address, destination address, IP protocol, transport layer source port, and destination port). A packet in a flow is expected to have the same set of tuples in the packet header. A packet flow to be controlled can be identified by a combination of tuples (e.g., Ethernet type field, source and/or destination IP address, source and/or destination User Datagram Protocol (UDP) ports, source/destination TCP ports, or any other header field) and a unique source and destination queue pair (QP) number or identifier. A packet may be used herein to refer to various formatted collections of bits that may be sent across a network, such as Ethernet frames, IP packets, TCP segments, UDP datagrams, etc. Also, as used in this document, references to L2, L3, L4, and L7 layers (layer 2, layer 3, layer 4, and layer 7) are references respectively to the second data link layer, the third network layer, the fourth transport layer, and the seventh application layer of the OSI (Open System Interconnection) layer model.

Transmission of streaming video and audio can be consistent with Real-time Transport Protocol (RTP). An example of RTP protocol is described in RFC 3550 (2003). Transmission of streaming video and audio can be consistent with a standard from Society of Motion Picture and Television Engineers (SMPTE) 2110 (2018). Packet formats to map MPEG-4 audio/video into RTP packets is specified in RFC 6416 (2011). Video payload formats can include, but are not limited to, H.261, H.263, H.264, H.265, and MPEG-1/MPEG-2. Audio payload formats can include, but are not limited to, G.711, G.723, G.726, G.729, GSM, QCELP, MP3, and DTMF. Transmission of streaming video and audio can be consistent with media streaming services such as Dynamic Streaming over HTTP (DASH) protocol or HTTP Live Streaming (HLS). Media can be transmitted using WebRTC or UDP/IP based streaming systems (e.g., Real Time Streaming Protocol (RTSP), quick UDP Internet Connections (QUIC), SMTPE 2022, Session Initiation Protocol (SIP) (RFC 3261 (2020)), ITU Telecommunication Standardization Sector (ITU-T) H.323 (1996), IR.94—IMS Profile for Conversational Video Service, Version 5.0 (2013), Jingle (XMPP), etc. Other protocols or media streaming protocols can be used such as Transmission Control Protocol (TCP) or User Datagram Protocol (UDP).

Figure 2B:
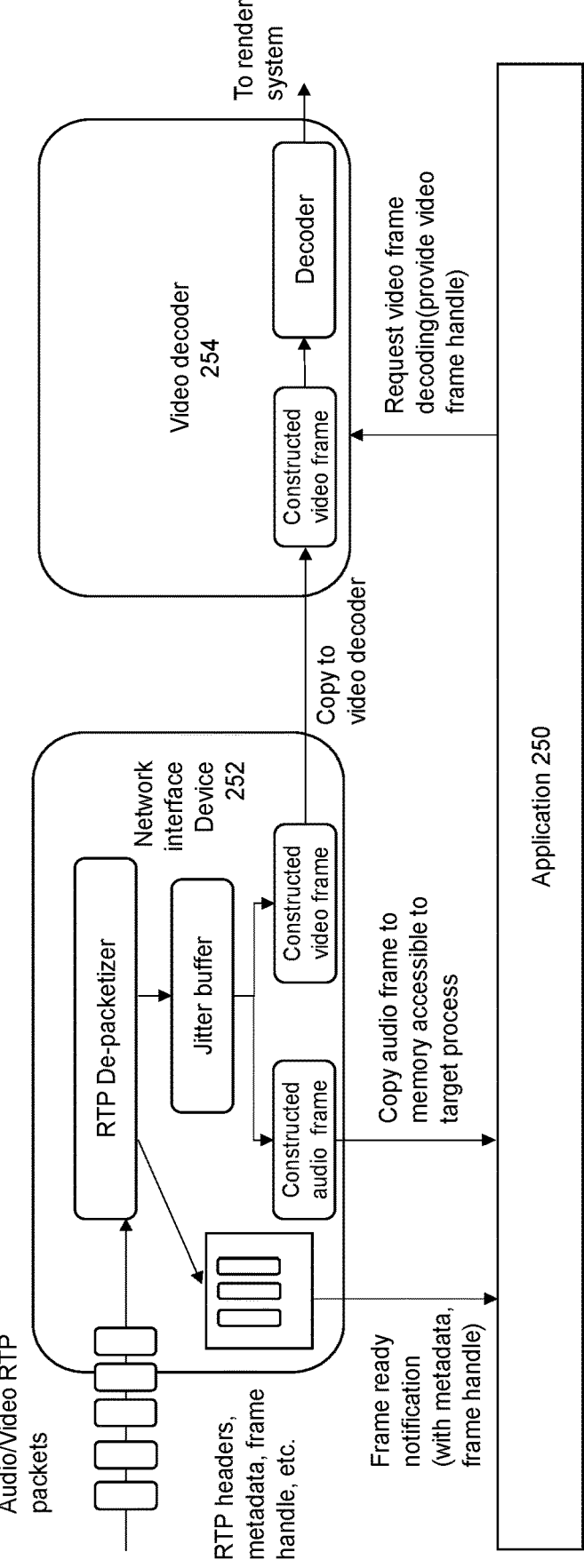
FIG. 2B depicts an example receiver.

FIG. 2B depicts an example receiver. Application 250 can configure network interface device 252 to perform offloaded video reconstruction by specifying a flow identifier of a stream of media, applied streaming protocol (e.g., RTP), video and/or audio decoding format to apply, destination memory address in which to store reconstructed media. In some examples, network interface device 252 is accessible to application 250 as a PCIe device, PCIe physical device, PCIe virtual function, or virtual device. Network interface device 252 can receive one or more packets consistent with the Real-time Transport Protocol (RTP) protocol. The one or more packets can include video and/or audio. Video and audio content from RTP packets can be stored in memory shared by network interface device 252 and video decoder 254 or copied to a buffer accessible to video decoder 254. Network interface device 252 can request video decoder 254 to decode the media into a stream. In some examples, video decoder 254 can be implemented using one or more of: a GPU, accelerator, ASIC, FPGA, or other circuitry. As described herein, network interface device 252 can perform jitter buffering and perform de-packetization of the media. After reconstruction of media and storage of the media into a destination buffer, network interface device 252 can provide an indication of packet receipt per frame or per stream and indication of at least one destination memory address of the frame or stream of frames to application 250.

At the sender and/or receiver, network interface device 202 and/or 252 can include one or more of: a network interface controller (NIC), a remote direct memory access (RDMA)-enabled NIC, SmartNIC, router, switch, forwarding element, infrastructure processing unit (IPU), or data processing unit (DPU). Network interface device can include one or more of: programmable processors, microprocessors, cores, programmable packet processing circuitry, field programmable gate array (FPGA), application specific integrated circuit (ASIC), one or more memory devices, and/or other circuitry.

At the sender and/or receiver, a GPU includes a video codec circuitry to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, H.265/HEVC, Alliance for Open Media (AOMedia) VP8, VP9, as well as the Society of Motion Picture & Television Engineers (SMPTE) 421M/VC-1, and Joint Photographic Experts Group (JPEG) formats such as JPEG, and Motion JPEG (MJPEG) formats.

Note that for received streamed media, operations of de-packetization and media reconstruction can be performed by a transmitter network interface device. In addition, for transmitting streamed media, operations of encoding media and packetization of encoded media can be performed by a receiver network interface device.

Figure 2C:
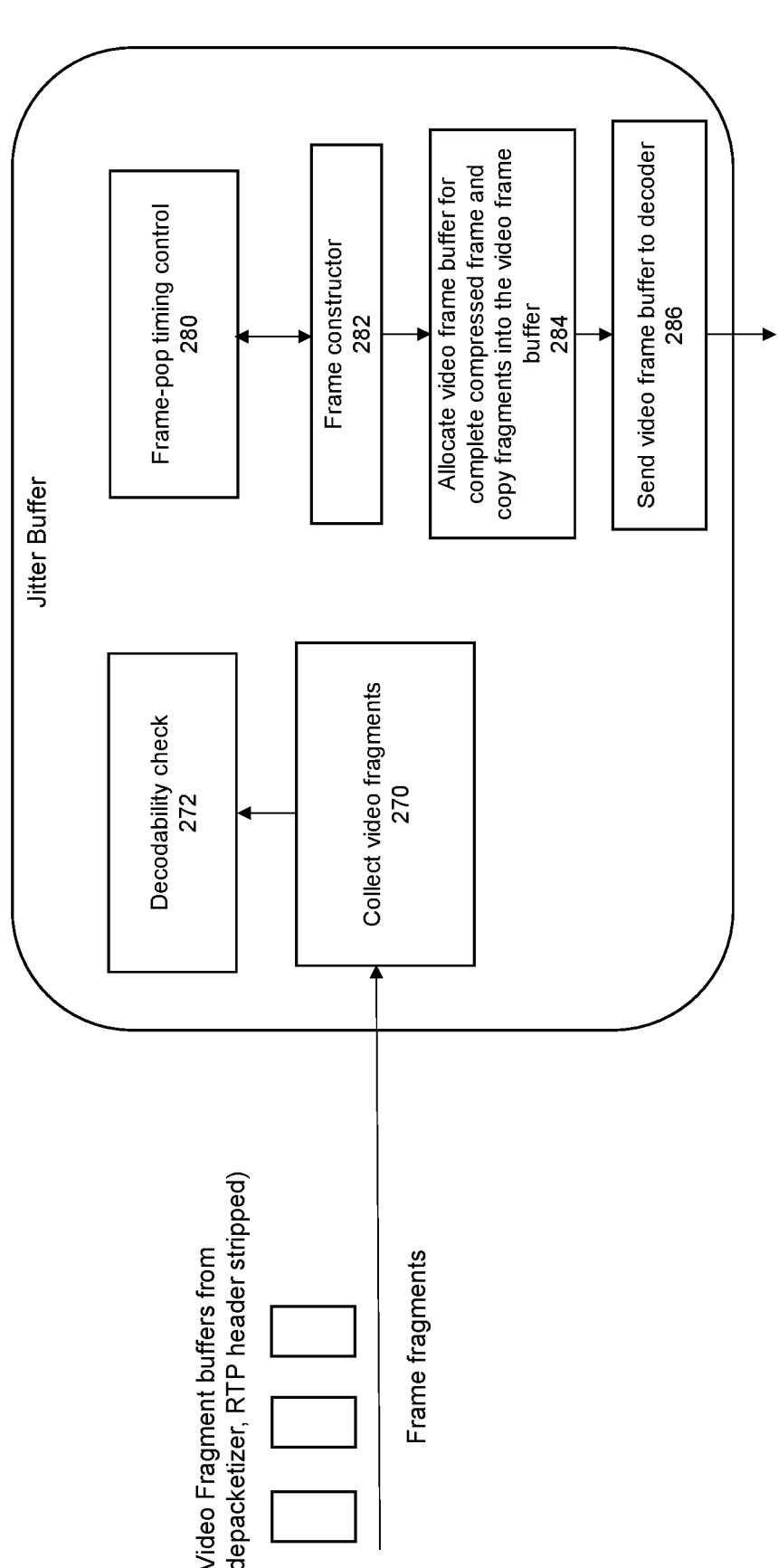
FIG. 2C depicts an example of operation of a jitter buffer.

FIG. 2C depicts an example of operation of a jitter buffer. A network interface device can perform operations of a jitter buffer to received media content. Contents of video fragment buffers from a depacketizing operation performed by network interface device can be accessed, such as RTP sequence number, start/marker information, payload type, but without RTP header. At 270, video fragments can be accessed from video fragment buffers and at 272, a decodability check can be performed that includes a frame reference check to determine if a frame is a reference frame or not and frame completeness check to determine if a frame is missing content from one or more missing packets. At 280, frame-pop timing control can be performed to track the frame receiving timing based on audio/video (A/V) synchronization, render presentation timestamps (PTS), and so forth. At 282, frame construction can be performed triggered by timing control. At 284, a video frame buffer in system memory can be allocated to store a compressed frame. Video fragments can be copied into the video frame buffer. At 286, content of the video frame buffer can be made available to a video decoder. For example, contents of a buffer can be copied to a memory accessible to a video decoder. As described herein, similar operations can be performed to audio corresponding to video frames (e.g., NET EQ).

Figure 3:
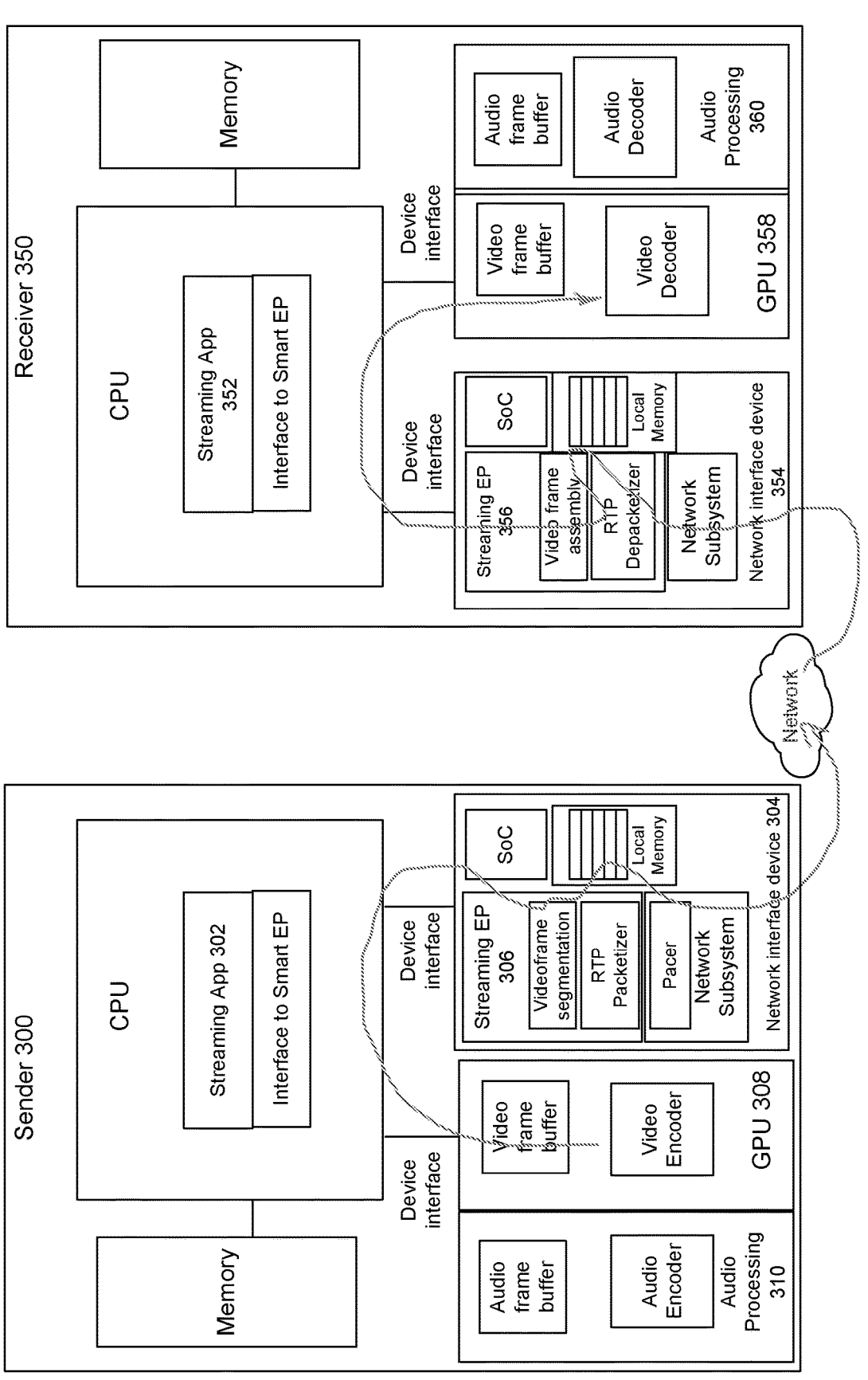
FIG. 3 depicts a media streaming flow using a network interface device that performs media streaming.

FIG. 3 depicts another example of a media streaming flow using a network interface device that performs media streaming. At sender 300, streaming application (App) 302 offloads media packetization to network interface device 304. Video frame buffer can be allocated in memory available to GPU 308 and GPU 308 can encode video frames and store encoded video frames in the GPU memory. A video frame can include a decodable video unit. A video frame may be constructed from multiple video fragments. A video fragment can include a portion of a video frame. The video frame buffer in the GPU memory can be referenced as a DMA buf from the Linux and application. The DMA buf address can be passed to streaming EP 306 for direct DMA using PCIe (or CXL). Streaming EP 306 can perform video frame segmentation operations, RTP packetization operations, and pacing operations before sending the network packets through a network (e.g., one or more switches or chip-to-chip connection) to receiver network interface device 354. Streaming EP 306 can perform RTP packetizer operations to split a video frame to video fragments and add RTP headers to video fragments, and pacing to control a pace of delivering RTP packets to network interface 304 for transmission to network interface 354, to reduce traffic bursts on network. Sender network interface device 304 may include circuitry to perform encryption of transmitted media content.

Audio frames associated with video frames can be processed in a similar manner as that of video frames. Audio and video can be transmitted in separate RTP streams identified by a synchronization source (SSRC) field in an RTP packet header.

Network interface device 304, streaming EP 306, GPU 308, and/or audio processing circuitry 310 can be implemented as a System on chip (SoC).

Receiver network interface 354 can receive RTP packets and store contents of RTP packets in a jitter buffer. In some examples, a network processing pipeline of receiver network interface device can be programmed to direct specific video flows (e.g., RTP flows) to streaming EP 356 for processing. Streaming EP 356 can store RTP flow context information for video frame reassembly. Streaming EP 356 can perform RTP de-packetization by removing RTP headers from received RTP packets and delivering video fragments to different video destinations. Streaming EP 356 can utilize a jitter buffer to store received video fragments and construct a video frame when fragments are ready for decoding. A jitter buffer can be allocated from on-die memory (e.g., static random access memory (SRAM) or System Level Cache). Streaming EP 356 can de-packetize the RTP packets and reassemble a video frame (e.g., compressed format video frame).

Receiver network interface device 354 can cause decryption of video frame contents. The decoded video frame can be copied to memory of GPU 358 using a PCIe or CXL consistent device interface, or other standards. The destination GPU memory buffer can be referenced in a DMA buf from Linux and application. DMA buf can be posted to the Media streaming EP before the video frame is received. GPU 358 can decode a video frame before display or storage memory. Audio frames associated with video frames can be processed in a similar manner as that of video frames.

Network interface device 354, streaming EP 356, GPU 358, and/or audio processing circuitry 360 can be implemented as a System on chip (SoC).

Streaming EP 306 and/or 356 can share a memory buffer with its associated network interface device and GPU and potentially reduce device interface bandwidth used to copy video and/or audio frames. Use of streaming EP 306 and/or 356 can reduce processing latency of streamed video and/or audio and potentially reduce power consumption associated with streaming or reconstructing media.

Figure 4A:
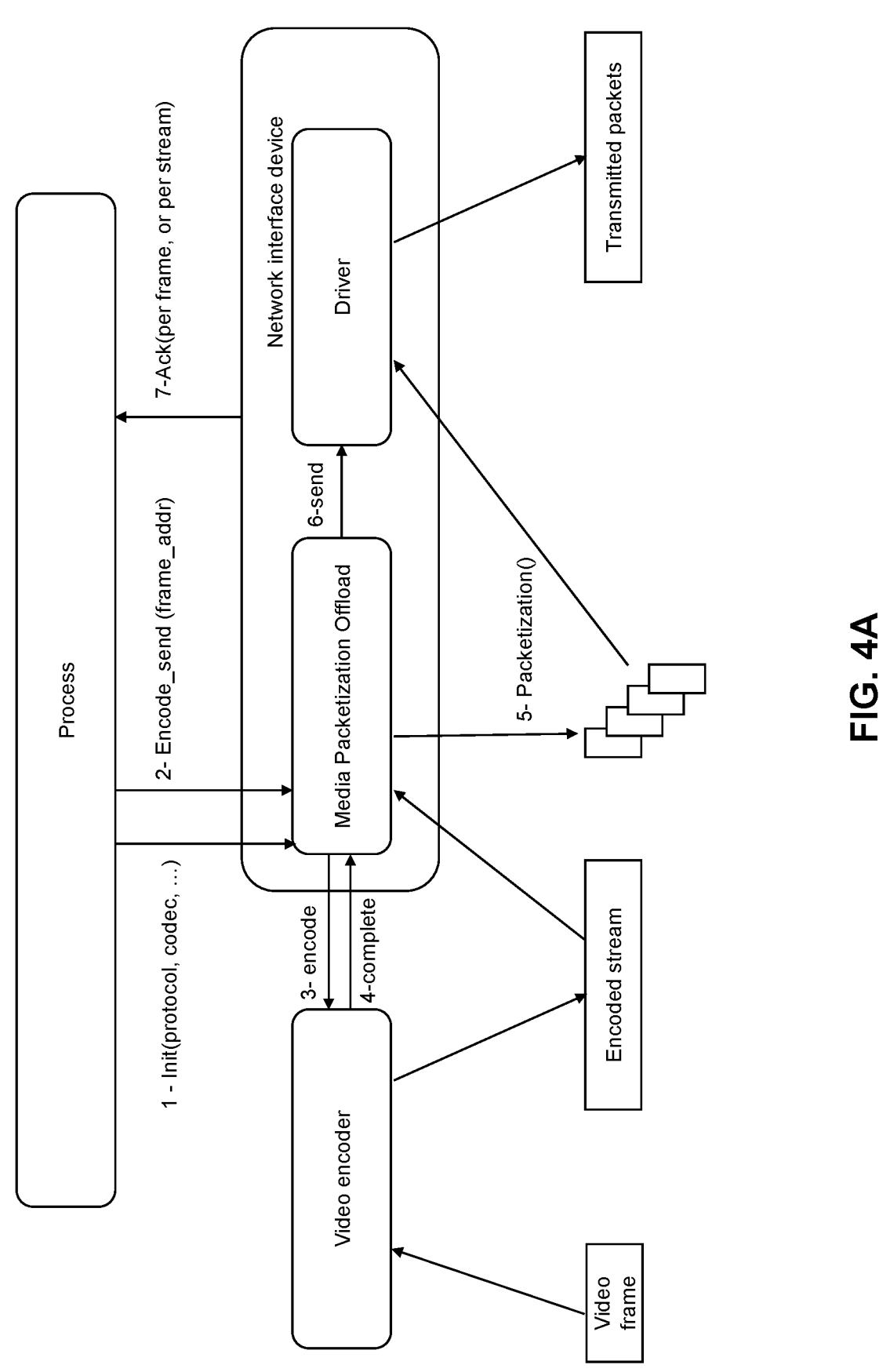
FIG. 4A depicts an example operation of a sender of a streaming media.

FIG. 4A depicts an example operation of a sender of a streaming media. At 1, a process can initialize a media packetization offload circuitry (e.g., streaming EP) of network interface device to perform offloaded compression, encoding, and/or packetization of media prior to transmission to a destination network interface device. For example, a process can issue an application program interface (API) (e.g., Init(protocol, codec)) to media packetization offload circuitry that specifies configurations such as a protocol to apply (e.g., RTP, H.323, and so forth) and codec to apply to encode media (e.g., H.264, MPEG.2, and so forth), and other parameters. In some examples, a specified codec to apply can indicate video and/or audio codec for media packetization offload circuitry to apply. At 2, the process can command the media packetization offload circuitry to perform streaming of media to a destination network interface device. For example, the process can issue an API (e.g., Encode_send (frame_addr)), that indicates an address in memory that stores media to be encoded and transmitted to the destination network interface device. At 3, the network interface device can request an encode operation to be performed by a video encoder of the identified media. At 4, the video encoder can indicate an encode operation is complete. The encoded media can be stored in memory and available for access by a media packetization offload circuitry. At 5, media packetization offload circuitry can perform packetization in accordance with the applicable protocol as well as perform packet pacing. At 6, the media packetization offload circuitry can indicate to a driver executed by network interface device to instruct network interface device to transmit packets to a destination network interface device. At 7, network interface device can indicate, to process, completion of a transmission of an encoded frame or stream of frames (e.g., Ack(per frame or per stream).

Figure 4B:
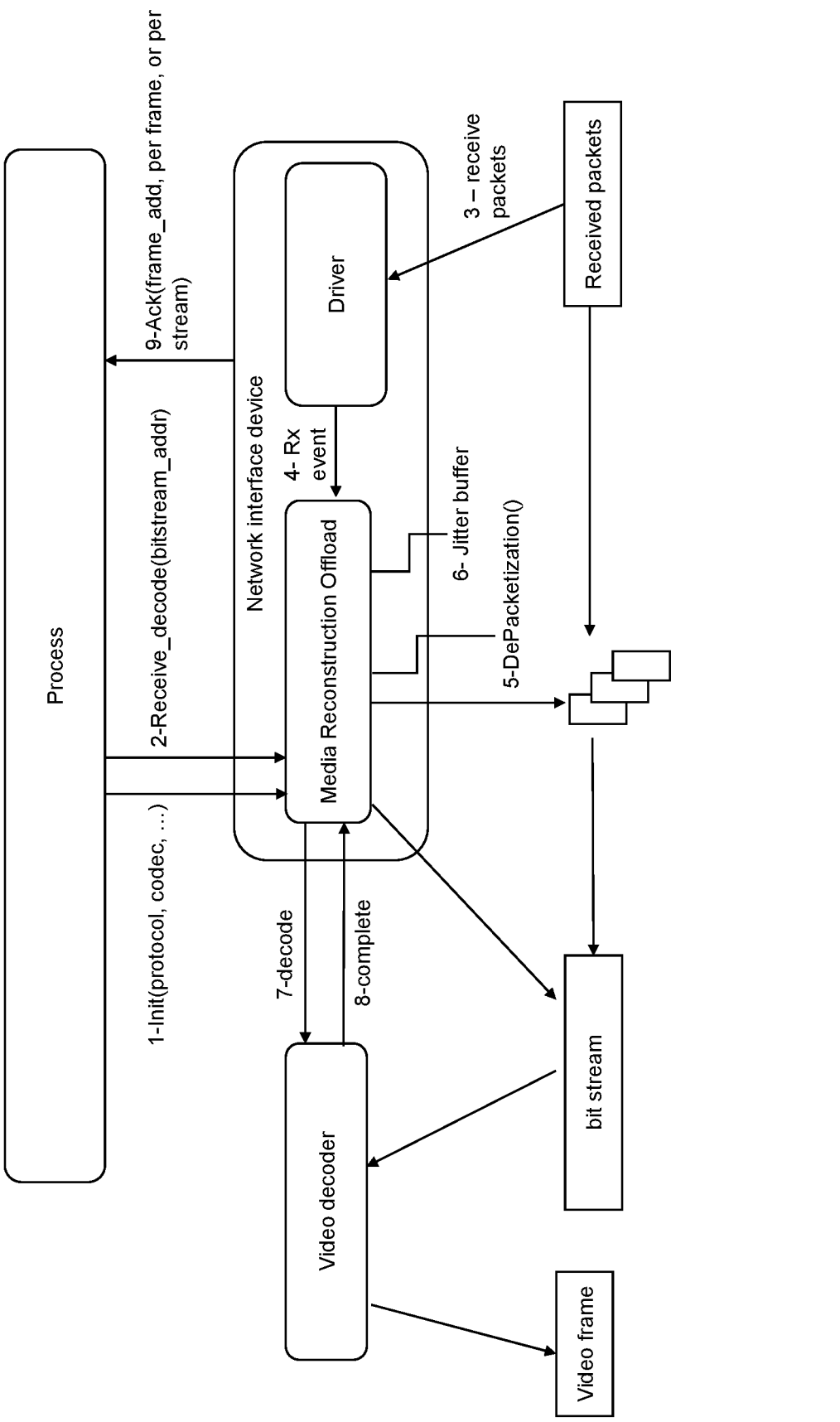
FIG. 4B depicts an example operation of a receiver of a streaming media.

FIG. 4B depicts an example operation of a receiver of a streaming media. At 1, a process can initialize a streaming EP (e.g., media reconstruction offload circuitry) to perform offloaded reconstruction of streamed media received in one or more packets. For example, a process can issue an application program interface (API) (e.g., Init(protocol, codec)), to network interface device that specifies at least protocol applied to receive media (e.g., RTP, H.323, or others), codec to apply to decode media (e.g., H.264, MPEG.2, and so forth), and other configurations. In some examples, a specified codec to apply can indicate video and/or audio codec that media packetization offload circuitry is to apply. At 2, the process can indicate to the media reconstruction offload circuitry a destination memory address to store reconstructed media. For example, a process can issue an API (e.g., Receive_decode(bitstream_addr)), that indicates an address in memory that stores decoded media and that was received from a sender network interface device and other configurations. At 3, the network interface device can receive one or more packets from a sender network interface device. Transmission of media by a sender network interface device may be consistent with the flow of FIG. 1A, 1B, or 4A.

At 4, a driver executed by processor of the network interface device can indicate a streaming media receive (Rx) event to media reconstruction offload circuitry. For media in received packets, media reconstruction offload circuitry can perform (5) de-packetization and (6) apply a jitter buffer. At 7, media reconstruction offload circuitry (e.g., streaming EP) can request a decode operation to be performed of the received media by a video decoder. At 8, the video decoder can indicate a decode operation is complete. The decoded media can be stored in memory and available for access by a media packetization offload circuitry. At 9, media packetization offload circuitry can indicate to a process executed by the host completion of a reconstruction of a frame or stream and indicate an address in memory that stores the frame or stream or frames (e.g., Ack(frame_address, per frame, or per stream). The reconstructed media can be available in a buffer identified by the process in an API at (2).

Figure 4C:
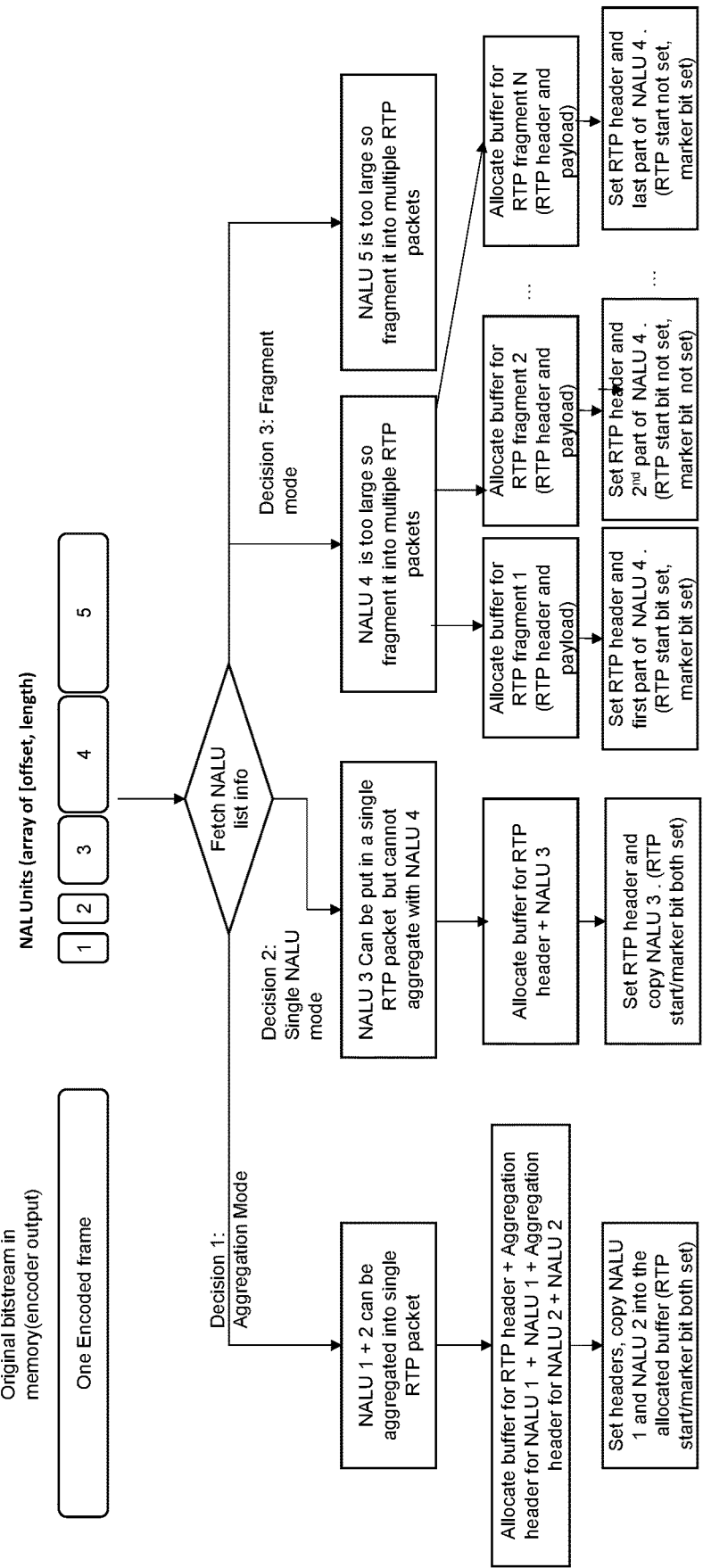
FIG. 4C depicts an example of operations that can be performed by a media streaming endpoint (EP) to packetize media frames.

FIG. 4C depicts an example of operations that can be performed by a streaming EP to packetize media frames. RTP Packetization can be codec-specific and an example described is with respect to H.264. A depacketization flow (not shown) can be a reverse of that shown in FIG. 4C. An RTP frame starts from RTP packet with start-bit set in RTP header and ends on RTP packet with msriarker-bit set. RTP depacketizer can utilize a jitter buffer for video frame construction after removal of RTP headers.

Figure 5A:
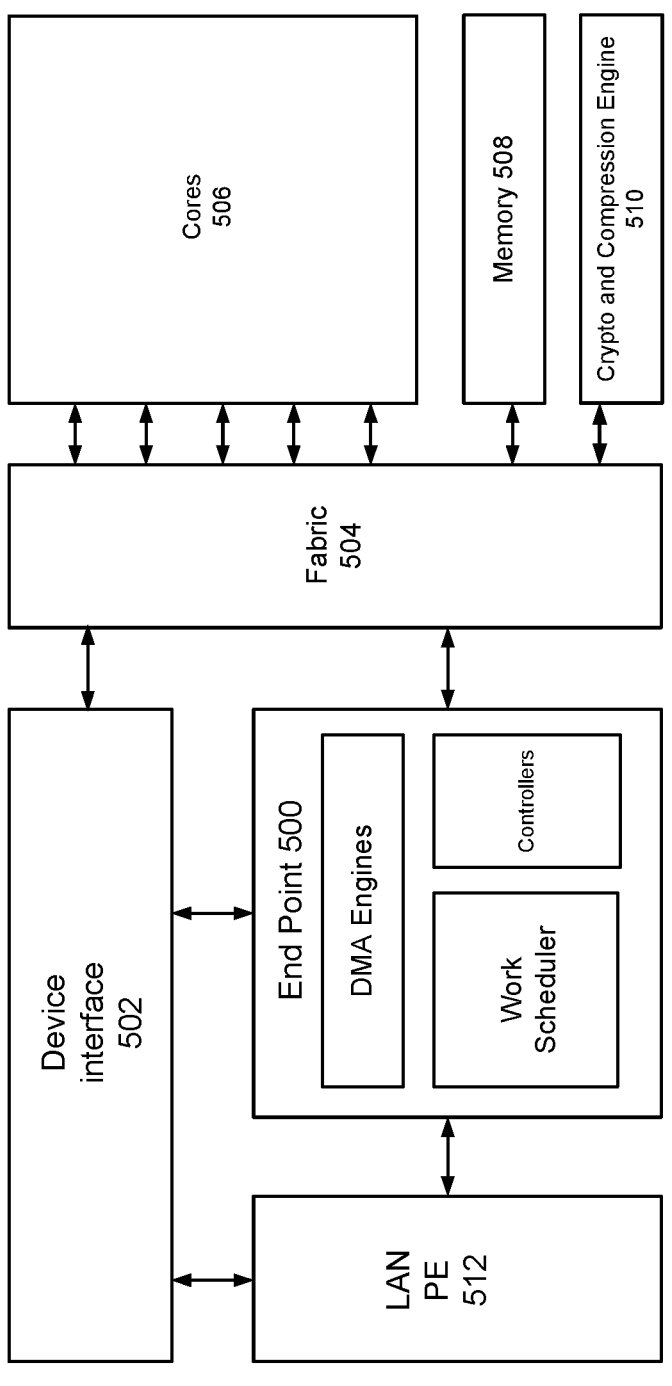
FIG. 5A depicts an example media streaming EP system.

FIG. 5A depicts an example media streaming EP system. Device interface 502 can provide communications with a host or server and endpoint 500, network protocol engine (LAN PE 512), and fabric 504. Endpoint 500 can include DMA engine circuitry, work scheduler, and controllers to manage offloaded operations of packetizing streaming video and media reconstruction, as described herein. Fabric 504 can provide communication among endpoint 500, cores 506, memory 508, and crypto and compression/decompression engine 510. Cores 506 can be accessed to perform commands. Network protocol engine (LAN PE 512) can transmit or receive packets.

Figure 5B:
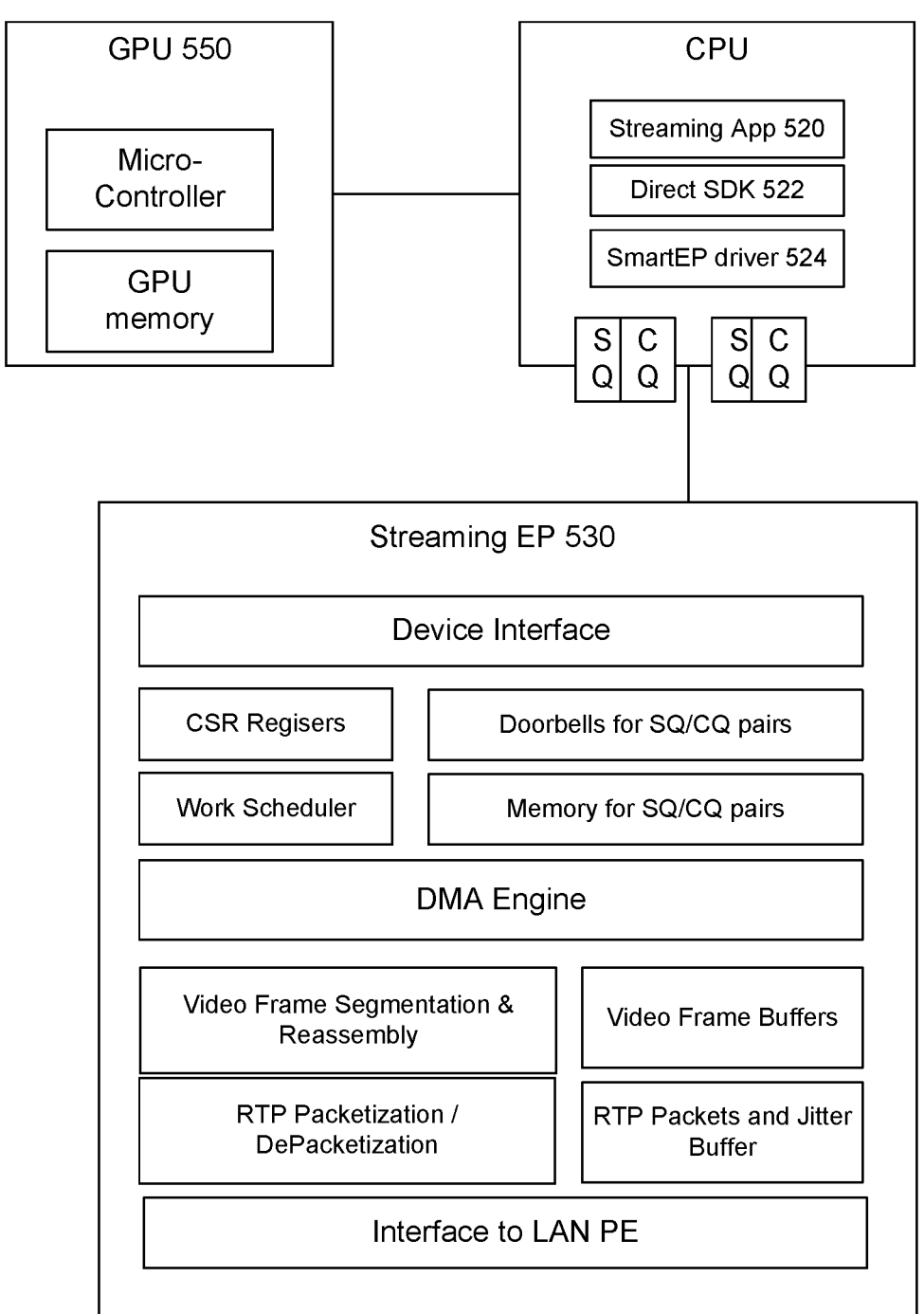
FIG. 5B depicts an example use of a media streaming EP.

FIG. 5B depicts an example use of a streaming EP. Streaming application (App) 520 can provide commands to direct SDK 522 to transmit streaming media to a destination. Direct SDK 522 can transfer commands from streaming application 520 to streaming EP device driver 524 or provide responses from streaming EP device driver 524 to streaming application 520. Streaming EP device driver 524 can provide a queue interface to send queue (SQ) and completion queue (CQ). Streaming EP device driver 524 can be consistent with Linux, Data Plane Development Kit (DPDK), OpenData-Plane, or other frameworks. Streaming EP device driver 524 can provide commands to streaming EP 530 using SQ. Streaming EP 530 can receive indications of command status (e.g., completions or errors) and events using a CQ. SQ and CQ can be used for respective video frame buffer posting and receiving.

Single Root I/O Virtualization (SR-IOV) and Sharing specification, version 1.1, published Jan. 20, 2010 specifies hardware-assisted performance input/output (I/O) virtualization and sharing of devices. Intel® Scalable I/O Virtualization (SIOV) permits configuration of a device to group its resources into multiple isolated Assignable Device Interfaces (ADIs). Direct Memory Access (DMA) transfers from/to an ADI are tagged with a unique Process Address Space identifier (PASID) number. SIOV enables software to flexibly compose virtual devices utilizing the hardware-assists for device sharing at finer granularity. An example technical specification for SIOV is Intel® Scalable I/O Virtualization Technical Specification, revision 1.0, June 2018, as well as earlier versions, later versions, and variations thereof.

In some examples, streaming EP 530 can be accessible as a PCIe device SR-IOV VF or PF, SIOV ADI, or other virtual device. A PF can expose Control and Status Register (CSR)

registers for configuration of streaming EP 530. Doorbell registers for SQ/CQ pairs can be accessible in the memory Base Address Register (BAR) from the PF. Commands can be defined for application 520 to request streaming EP 530 to perform video frame sending and receiving. Work scheduler can order execution of commands by components of streaming EP 530. For example, DMA engine can copy data from host or server memory to video frame buffers or from video frame buffers to host or server memory. Streaming EP 530 can perform video frame segmentation or re-assembly as well as RTP packetization or de-packetization, as described herein. LAN PE can perform operations related to RTP stateless offload such as cyclic redundancy check (CRC) or checksum validation. Memory (e.g., SRAM or SLC (system level cache)) can be used for jitter buffers to store video frames. Streaming EP 530 can be implemented as one or more of: field programmable gate array (FPGA), application specific integrated circuit (ASIC), processors, accelerators, circuitry, and so forth.

GPU 550 can perform encoding or decoding of video and/or audio stored in buffers of GPU memory. Direct SDK 522 can manage access to buffers in GPU memory. For example, direct SDK 522 can manage access to GPU memory buffers using the Linux DMA buffer structures where video frame source/destination buffers in GPU can be referenced as DMA bufs, and posted to a SQ from streaming EP 530. GPU 550 can send video frames directly to streaming EP 530 or receive video frames from streaming EP 530.

Figure 6A:
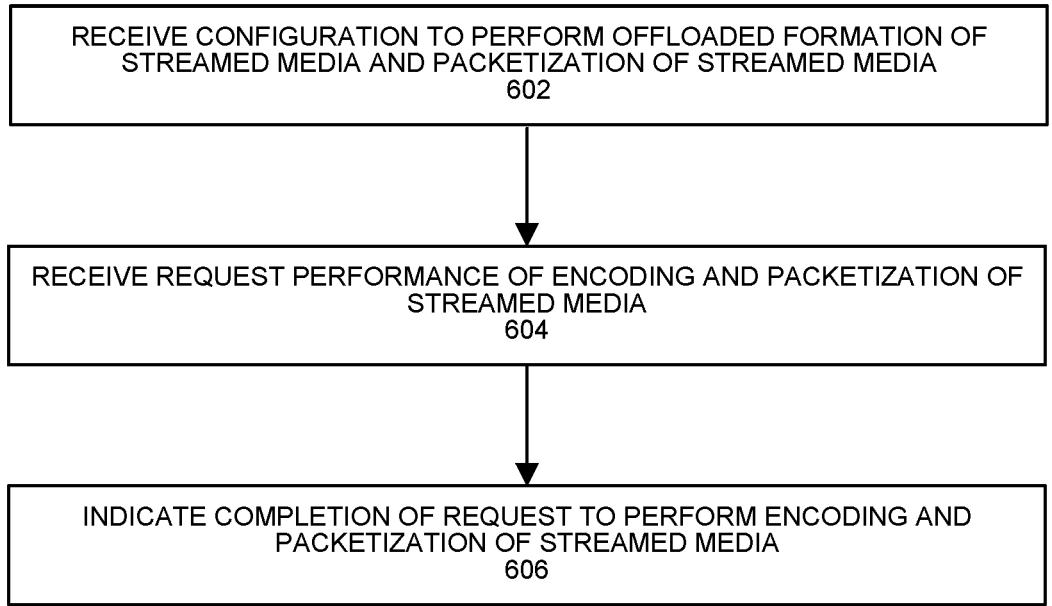
FIGS. 6A and 6B depict example processes.

FIG. 6A depicts an example process to perform streaming. The process can be performed at a streaming EP associated with a network interface device to perform offloaded encoding and packetization of streamed media. In some examples, the process can follow initialization of a connection between sender and destination systems such as described with respect to FIG. 1B. At 602, a streaming EP can be initialized to perform offloaded streaming of media to a destination network interface device. For example, an application can issue an application program interface (API) to the network interface device that specifies protocol to apply (e.g., RTP), codec to apply to encode media (e.g., H.264).

At 604, the application can command the streaming EP to perform streaming of media that is to be transmitted to a destination network interface device. For example, the application can issue an API to streaming EP that indicates an address in memory that stores media to be encoded and is to be transmitted to the destination network interface device. The streaming EP can request an encode operation on the identified media to be performed by a video encoder. The streaming EP can perform packetization in accordance with the specified protocol as well as packet pacing. At 606, streaming EP can indicate to process completion of a transmission of an encoded frame or stream of frames to the application. Thereafter, the network interface device can transmit one or more packets with the encoded media to the destination network interface device.

Figure 6B:
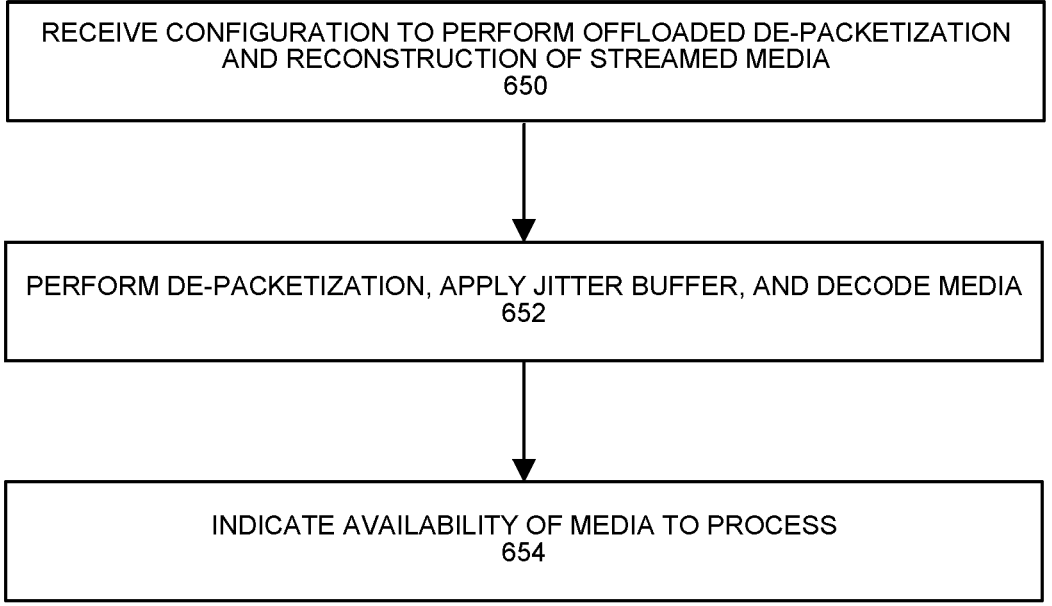

FIG. 6B depicts an example process. The process can be performed at a streaming EP associated with a network interface device that is to perform offloaded de-packetization and reconstruction of streamed media. In some examples, the process can follow initialization of a connection between sender and destination systems such as described with respect to FIG. 1B. At 650, an application can initialize a streaming EP to perform offloaded reconstruction of received streaming media. For example, the application can issue an application program interface (API) to streaming EP that specifies a protocol applied to receive media (e.g., RTP) and codec to apply to decode media (e.g., H.264). The application can indicate to the streaming EP a destination address to store reconstructed media received in one or more packets.

At 652, the network interface device can receive one or more packets from a sender network interface device and streaming EP can perform de-packetization and media reconstruction. Streaming EP can perform de-packetization and apply a jitter buffer for received media. A video decoder can decode received media and store the decoded media into memory. At 654, streaming EP can indicate to the application availability of reconstructed media frame or stream. Thereafter, the application can cause display of the media, re-transmit the media, or access the media.

Figure 7:
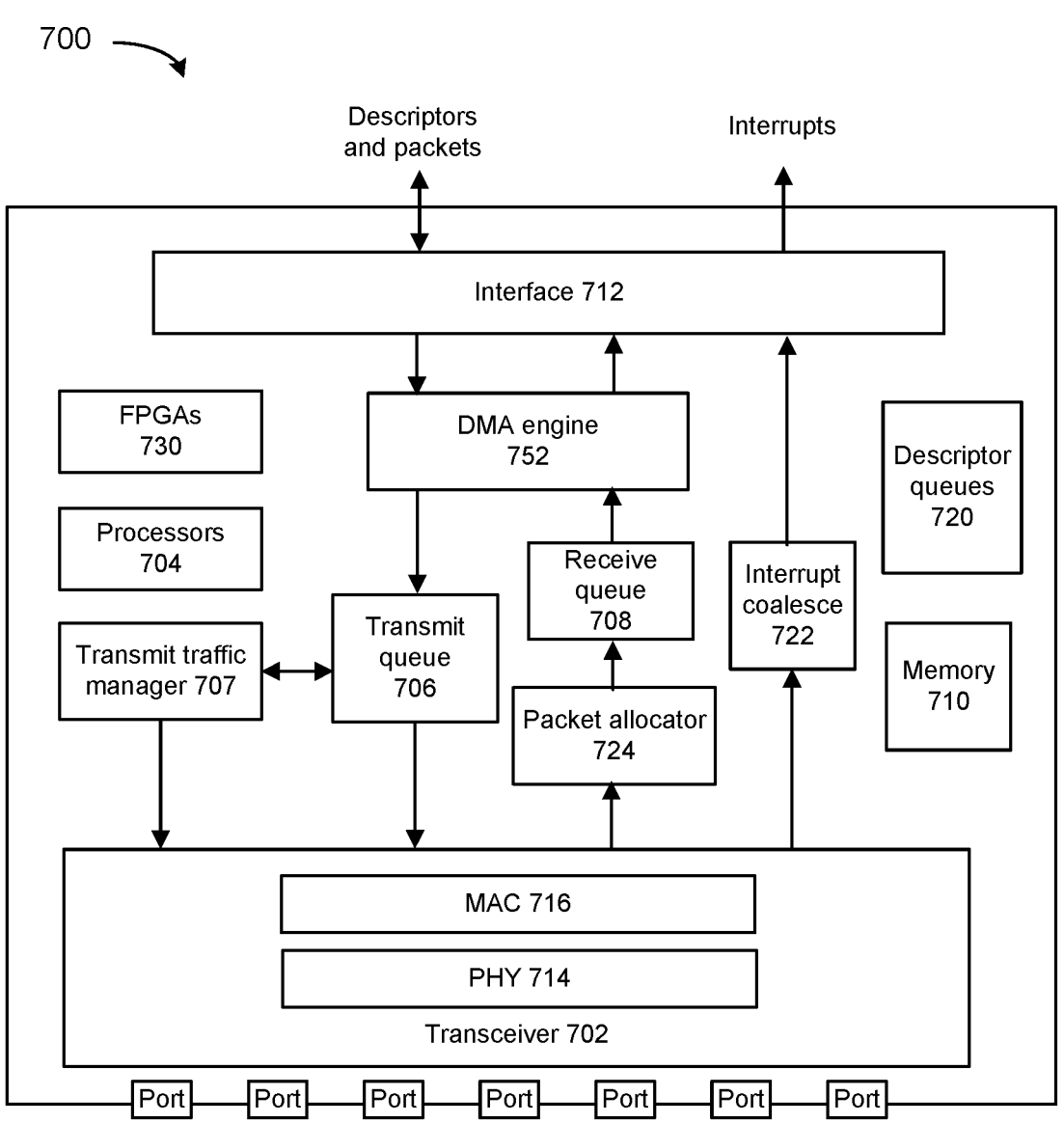
FIG. 7 depicts a network interface device.

FIG. 7 depicts an example network interface device. Various hardware and software resources in the network interface can be configured to perform offloaded media streaming and packetization for transmission and/or de-packetization and reconstruction of media, as described herein. In some examples, network interface 700 can be implemented as a network interface controller, network interface card, a host fabric interface (HFI), or host bus adapter (HBA), and such examples can be interchangeable. Network interface 700 can be coupled to one or more servers using a bus, PCIe, CXL, or DDR. Network interface 700 may be embodied as part of a system-on-a-chip (SoC) that includes one or more processors, or included on a multichip package that also contains one or more processors.

Some examples of network device 700 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

Network interface 700 can include transceiver 702, processors 704, transmit queue 706, receive queue 708, memory 710, and bus interface 712, and DMA engine 752. Transceiver 702 can be capable of receiving and transmitting packets in conformance with the applicable protocols such as Ethernet as described in IEEE 802.3, although other protocols may be used. Transceiver 702 can receive and transmit packets from and to a network via a network medium (not depicted). Transceiver 702 can include PHY circuitry 714 and media access control (MAC) circuitry 716. PHY circuitry 714 can include encoding and decoding circuitry (not shown) to encode and decode data packets according to applicable physical layer specifications or standards. MAC circuitry 716 can be configured to perform MAC address filtering on received packets, process MAC headers of received packets by verifying data integrity, remove preambles and padding, and provide packet content for processing by higher layers. MAC circuitry 716 can be configured to assemble data to be transmitted into packets, that include destination and source addresses along with network control information and error detection hash values.

For packets that are enqueued for transmission in transmit queue 706, transmit traffic manager 707 can perform performs the transmit scheduling.

Processors 704 can be any a combination of: a processor, core, graphics processing unit (GPU), field programmable gate array (FPGA), application specific integrated circuit (ASIC), or other programmable hardware device that allow programming of network interface 700. For example, a "smart network interface" or SmartNIC can provide packet processing capabilities in the network interface using processors 704.

Processors 704 can include a programmable processing pipeline that is programmable by P4, C, Python, Broadcom Network Programming Language (NPL), NVIDIA® CUDA®, NVIDIA® DOCA™, or x86 compatible executable binaries or other executable binaries. A programmable processing pipeline can include one or more match-action units (MAUs) that can schedule packets for transmission using one or multiple granularity lists, as described herein. Processors, FPGAs, other specialized processors, controllers, devices, and/or circuits can be used utilized for packet processing or packet modification. Ternary content-addressable memory (TCAM) can be used for parallel match-action or look-up operations on packet header content. Processors 704 can be configured to perform offloaded media streaming and packetization for transmission and/or de-packetization and reconstruction of media, as described herein Packet allocator 724 can provide distribution of received packets for processing by multiple CPUs or cores using receive side scaling (RSS). When packet allocator 724 uses RSS, packet allocator 724 can calculate a hash or make another determination based on contents of a received packet to determine which CPU or core is to process a packet.

Interrupt coalesce 722 can perform interrupt moderation whereby network interface interrupt coalesce 722 waits for multiple packets to arrive, or for a time-out to expire, before generating an interrupt to host system to process received packet(s). Receive Segment Coalescing (RSC) can be performed by network interface 700 whereby portions of incoming packets are combined into segments of a packet. Network interface 700 provides this coalesced packet to an application.

Direct memory access (DMA) engine 752 can copy a packet header, packet payload, and/or descriptor directly from host memory to the network interface or vice versa, instead of copying the packet to an intermediate buffer at the host and then using another copy operation from the intermediate buffer to the destination buffer.

Memory 710 can be any type of volatile or non-volatile memory device and can store any queue or instructions used to program network interface 700. Transmit queue 706 can include data or references to data for transmission by network interface. Receive queue 708 can include data or references to data that was received by network interface from a network. Descriptor queues 720 can include descriptors that reference data or packets in transmit queue 706 or receive queue 708. Bus interface 712 can provide an interface with host device (not depicted). For example, bus interface 712 can be compatible with or based at least in part on PCI, PCI Express, PCI-x, Serial ATA, and/or USB (although other interconnection standards may be used), or proprietary variations thereof.

Figure 8:
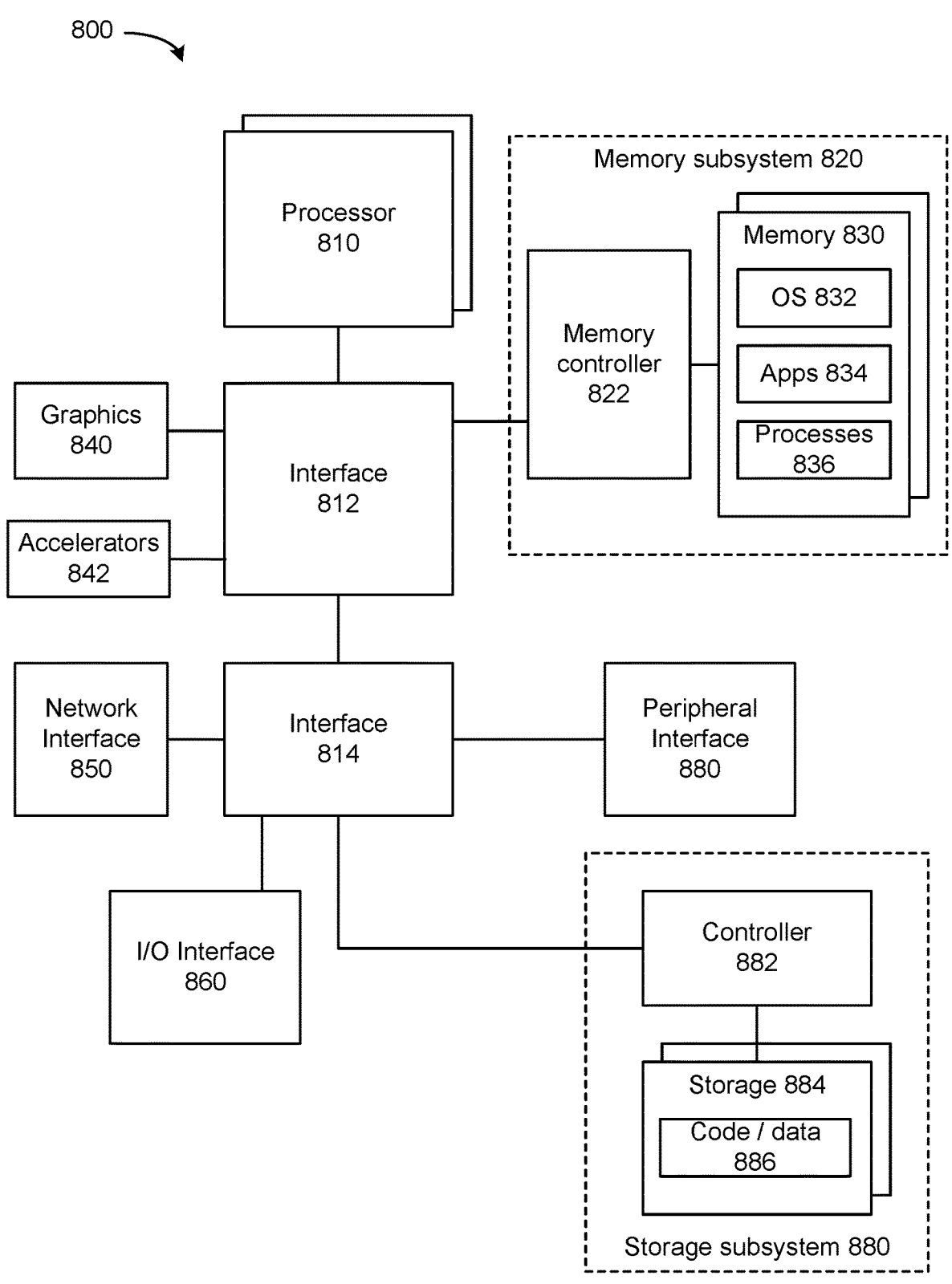
FIG. 8 depicts a system.

FIG. 8 depicts an example computing system. Components of system 800 (e.g., processor 810, network interface 850, and so forth) can be configured to perform offloaded media streaming and packetization for transmission and/or de-packetization and reconstruction of media, as described herein. System 800 includes processor 810, which provides processing, operation management, and execution of instructions for system 800. Processor 810 can include any type of microprocessor, central processing unit (CPU), graphics processing unit (GPU), processing core, or other processing hardware to provide processing for system 800, or a combination of processors. Processor 810 controls the overall operation of system 800, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 800 includes interface 812 coupled to processor 810, which can represent a higher speed interface or a high throughput interface for system components that needs higher bandwidth connections, such as memory subsystem 820 or graphics interface components 840, or accelerators 842. Interface 812 represents an interface circuit, which can be a standalone component or integrated onto a processor die. Where present, graphics interface 840 interfaces to graphics components for providing a visual display to a user of system 800. In one example, graphics interface 840 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 840 generates a display based on data stored in memory 830 or based on operations executed by processor 810 or both. In one example, graphics interface 840 generates a display based on data stored in memory 830 or based on operations executed by processor 810 or both.

Accelerators 842 can be a fixed function or programmable offload engine that can be accessed or used by a processor 810. For example, an accelerator among accelerators 842 can provide compression (DC) capability, cryptography services such as public key encryption (PKE), cipher, hash/authentication capabilities, decryption, or other capabilities or services. In some embodiments, in addition or alternatively, an accelerator among accelerators 842 provides field select controller capabilities as described herein. In some cases, accelerators 842 can be integrated into a CPU socket (e.g., a connector to a motherboard or circuit board that includes a CPU and provides an electrical interface with the CPU). For example, accelerators 842 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 842 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 820 represents the main memory of system 800 and provides storage for code to be executed by processor 810, or data values to be used in executing a routine. Memory subsystem 820 can include one or more memory devices 830 such as read-only memory (ROM), flash memory, one or more varieties of random access memory (RAM) such as DRAM, or other memory devices, or a combination of such devices. Memory 830 stores and hosts, among other things, operating system (OS) 832 to provide a software platform for execution of instructions in system 800. Additionally, applications 834 can execute on the software platform of OS 832 from memory 830. Applications 834 represent programs that have their own operational logic to perform execution of one or more functions. Processes 836 represent agents or routines that provide auxiliary functions to OS 832 or one or more applications 834 or a combination. OS 832, applications 834, and processes 836 provide software logic to provide functions for system 800. In some examples, applications 834 can request a streaming EP to perform offload operations related to media streaming and packetization for transmission and/or de-packetization and reconstruction of media, as described herein.

In one example, memory subsystem 820 includes memory controller 822, which is a memory controller to generate and issue commands to memory 830. It will be understood that memory controller 822 could be a physical part of processor 810 or a physical part of interface 812. For example, memory controller 822 can be an integrated memory controller, integrated onto a circuit with processor 810.

In some examples, OS 832 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, NVIDIA®, Broadcom®, Qualcomm®, IBM®, Texas Instruments®, among others. In some examples, OS 832 and/or driver can enable or disable a streaming EP to perform offloaded media streaming and packetization for transmission and/or de-packetization and reconstruction of media, as described herein. In some examples, OS 832 and/or driver can configure a streaming EP to perform offloaded media streaming and packetization for transmission and/or de-packetization and reconstruction of media, as described herein.

While not specifically illustrated, it will be understood that system 800 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 800 includes interface 814, which can be coupled to interface 812. In one example, interface 814 represents an interface circuit, which can include standalone components and integrated circuitry. In one example, multiple user interface components or peripheral components, or both, couple to interface 814. Network interface 850 provides system 800 the ability to communicate with remote devices (e.g., servers or other computing devices) over one or more networks. Network interface 850 can include an Ethernet adapter, wireless interconnection components, cellular network interconnection components, USB (universal serial bus), or other wired or wireless standards-based or proprietary interfaces. Network interface 850 can transmit data to a device that is in the same data center or rack or a remote device, which can include sending data stored in memory. Network interface 850 (e.g., packet processing device) can execute a virtual switch to provide virtual machine-to-virtual machine communications for virtual machines (or containers, microservices, or other virtual execution environments) in a same server or among different servers. Network interface 850 can include a streaming EP in some examples.

Some examples of network interface 850 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

Graphics 840, accelerators 842, and/or network interface 850 can include Direct memory access (DMA) circuitry that can copy data to or from host memory, instead of copying the packet to an intermediate buffer at the host and then using another copy operation from the intermediate buffer to the destination buffer.

In one example, system 800 includes one or more input/output (I/O) interface(s) 860. I/O interface 860 can include one or more interface components through which a user interacts with system 800 (e.g., audio, alphanumeric, tactile/touch, or other interfacing). Peripheral interface 870 can include any hardware interface not specifically mentioned above. Peripherals refer generally to devices that connect dependently to system 800. A dependent connection is one where system 800 provides the software platform or hardware platform or both on which operation executes, and with which a user interacts.

In one example, system 800 includes storage subsystem 880 to store data in a nonvolatile manner. In one example, in certain system implementations, at least certain components of storage 880 can overlap with components of memory subsystem 820. Storage subsystem 880 includes storage device(s) 884, which can be or include any conventional medium for storing large amounts of data in a nonvolatile manner, such as one or more magnetic, solid state, or optical based disks, or a combination. Storage 884 holds code or instructions and data 886 in a persistent state (e.g., the value is retained despite interruption of power to system 800). Storage 884 can be generically considered to be a "memory," although memory 830 is typically the executing or operating memory to provide instructions to processor 810. Whereas storage 884 is nonvolatile, memory 830 can include volatile memory (e.g., the value or state of the data is indeterminate if power is interrupted to system 800). In one example, storage subsystem 880 includes controller 882 to interface with storage 884. In one example controller 882 is a physical part of interface 814 or processor 810 or can include circuits or logic in both processor 810 and interface 814.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). Another example of volatile memory includes cache or static random access memory (SRAM).

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, or NVM devices that use chalcogenide phase change material (for example, chalcogenide glass).

A power source (not depicted) provides power to the components of system 800. More specifically, power source typically interfaces to one or multiple power supplies in system 800 to provide power to the components of system 800. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 800 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMB A) interconnect, OpenCAPI, Gen-Z, Infinity Fabric (IF), Cache Coherent Interconnect for Accelerators (COX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Figure 9:
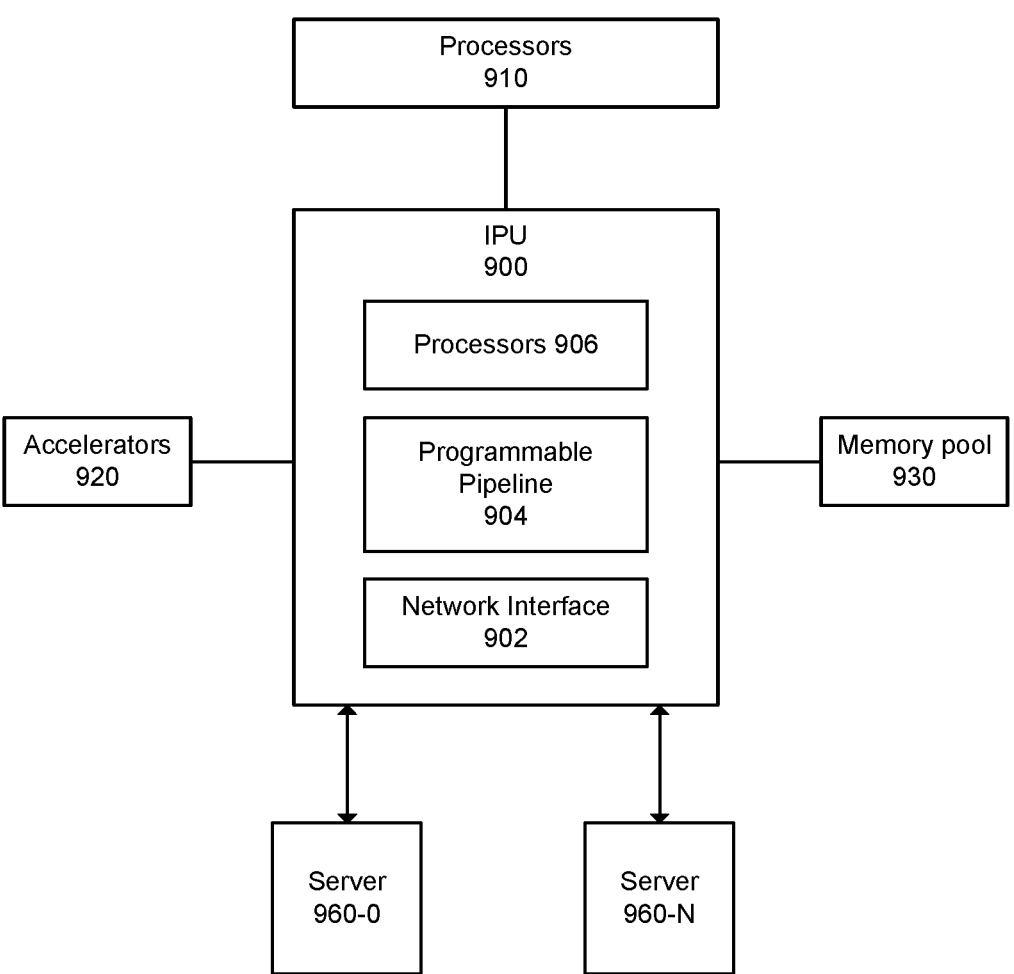
FIG. 9 depicts a system.

FIG. 9 depicts an example system. In this system, IPU 900 manages performance of one or more processes using one or more of processors 906, processors 910, accelerators 920, memory pool 930, or servers 940-0 to 940-N, where N is an integer of 1 or more. In some examples, processors 906 of IPU 900 can execute one or more processes, applications, VMs, containers, microservices, and so forth that request performance of workloads by one or more of: processors 910, accelerators 920, memory pool 930, and/or servers 940-0 to 940-N. IPU 900 can utilize network interface 902 or one or more device interfaces to communicate with processors 910, accelerators 920, memory pool 930, and/or servers 940-0 to 940-N. IPU 900 can utilize programmable pipeline 904 to process packets that are to be transmitted from network interface 902 or packets received from network interface 902. In some examples, processes executed by processors 910 or 906 can offload to programmable pipeline 904 or accelerators 920, tasks related to media stream transmission including media frame segmentation and RTP packetization and/or media stream reconstruction including reassembly and RTP de-packetization. Programmable pipeline 904 and/or processors 906 can be configured to perform offloaded media streaming and packetization for transmission and/or de-packetization and reconstruction of media, as described herein.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

References to standards herein can refer to earlier versions, later versions, or derivatives one or more versions of a standard.

Example 1 includes one or more examples, and includes an apparatus comprising: an interface and a network interface device coupled to the interface, the network interface device comprising: circuitry to: receive a request to perform offloaded media encoding and packetization prior to transmission of the media to a receiver, wherein the media comprises video and audio; perform encoding of the media; perform packetization of the encoded media into one or more packets based on Real-time Transport Protocol (RTP) protocol; and cause transmission of the one or more packets to the receiver.

Example 2 includes one or more examples, wherein the circuitry is accessible as a Peripheral Component Interconnect express (PCIe) physical function (PF).

Example 3 includes one or more examples, wherein the circuitry is to receive an initialization specifying one or more of: transmit protocol to apply, a video encoding type to apply, an audio encoding type to apply, and destination address of streamed media.

Example 4 includes one or more examples, wherein the request comprises one or more of: a request to encode media and a source memory address of the media.

Example 5 includes one or more examples, wherein the circuitry is to provide an indication of packet transmission completion or error per frame or per stream.

Example 6 includes one or more examples, wherein the circuitry is to request a video encoder to encode the media.

Example 7 includes one or more examples, comprising: a server, wherein the server comprises a processor that is to execute a process that is to provide the request to transmit media to a receiver and wherein the server comprises a memory device to store media that is to be transmitted.

Example 8 includes one or more examples, wherein the network interface device comprises circuitry to receive a second request to perform de-packetization and reconstruction of received media from a transmitter; receive one or more packets consistent Real-time Transport Protocol (RTP) protocol, wherein the one or more packets comprise the received media; perform jitter buffering; and perform de-packetization of the received media, wherein the received media comprises video and audio.

Example 9 includes one or more examples, and includes an apparatus comprising: an interface and a network interface device coupled to the interface, the network interface device comprising: circuitry to: receive a request to perform de-packetization and reconstruction of received media from a transmitter; receive one or more packets consistent Real-time Transport Protocol (RTP) protocol, wherein the one or more packets comprise the received media; perform de-packetization of the received media, wherein the received media comprises video and audio; apply a jitter buffer to the de-packetized received media; and copy the de-packetized received media after application of the jitter buffer to a destination memory.

Example 10 includes one or more examples, wherein the circuitry is accessible a Peripheral Component Interconnect express (PCIe) physical function (PF).

Example 11 includes one or more examples, wherein the circuitry is to receive an initialization specifying one or more of: flow identifier of the one or more packets that comprise the received media, applied transmit protocol, video decoding to apply, audio decoding to apply, or destination address to store the received media.

Example 12 includes one or more examples, wherein the request comprises one or more of: a request to decode media and an address in memory to store the received media.

Example 13 includes one or more examples, wherein the circuitry is to provide an indication of packet receipt per frame or per stream.

Example 14 includes one or more examples, wherein the circuitry is to request a video decoder to decode the received media.

Example 15 includes one or more examples, comprising: a server, wherein the server comprises a processor that is to execute a process that is to provide the request to perform de-packetization and reconstruction of received media from a transmitter and wherein the server comprises a memory device to store the received media.

Example 16 includes one or more examples, and includes at least one non-transitory computer-readable medium comprising instructions stored thereon, that if executed by one or more processors, cause the one or more processors to: execute an operating system (OS) to: configure circuitry of a network interface device to perform a request to perform media encoding and packetization prior to transmission of the media to a receiver, wherein the media comprises video and audio.

Example 17 includes one or more examples, wherein the request comprises one or more of: a request to encode media or a source memory address of the media.

Example 18 includes one or more examples, comprising instructions stored thereon, that if executed by one or more processors, cause the one or more processors to: execute the OS to configure the circuitry of the network interface device to perform a second request to perform de-packetization and reconstruction of received media from a transmitter.

Example 19 includes one or more examples, wherein the second request comprises one or more of: a request to decode media and a memory address to store the decoded media.

Example 20 includes one or more examples, wherein the network interface device comprises one or more of: a network interface controller (NIC), a remote direct memory access (RDMA)-enabled NIC, SmartNIC, router, switch, forwarding element, infrastructure processing unit (IPU), or data processing unit (DPU).

What is claimed is:

1. An apparatus comprising:
a network interface device comprising:
    a direct memory access (DMA) circuitry;
    a host interface;
    a network interface to transmit and receive packets; and
    circuitry to:
        receive a request to perform offloaded media encoding and packetization prior to transmission of the media to a receiver, wherein the media comprises video and audio;
        perform encoding of the media, wherein the encoding of the media comprises performing applying a video and/or audio compression encoding on the media;
        perform packetization of the encoded media into one or more packets based on a media streaming protocol; and
        cause transmission of the one or more packets to the receiver.

2. The apparatus of claim 1, wherein the circuitry is accessible via a Peripheral Component Interconnect express (PCIe) interface.

3. The apparatus of claim 1, wherein the circuitry is to receive an initialization specifying one or more of: transmit protocol to apply, a video encoding type to apply, an audio encoding type to apply, and destination address of streamed media.

4. The apparatus of claim 1, wherein the request comprises one or more of: a request to encode media and a source memory address of the media.

5. The apparatus of claim 1, wherein the circuitry is to provide an indication of packet transmission completion or error per frame or per stream.

6. The apparatus of claim 1, wherein the circuitry is to request a video encoder to encode the media.

7. The apparatus of claim 1, comprising:
a server, wherein the server comprises a processor that is to execute a process that is to provide the request to transmit media to a receiver and wherein the server comprises a memory device to store media that is to be transmitted.

8. The apparatus of claim 1, wherein the network interface device comprises:
circuitry to:
    receive a second request to perform de-packetization and reconstruction of received media from a transmitter;
    receive one or more packets consistent with a media streaming protocol, wherein the one or more packets comprise the received media;
    perform jitter buffering; and
    perform de-packetization of the received media, wherein the received media comprises video and audio.

9. An apparatus comprising:
a network interface device comprising:

a direct memory access (DMA) circuitry;

a host interface;

a network interface to transmit and receive packets and circuitry to:

receive a request to perform de-packetization and reconstruction of received media from a transmitter;

receive one or more packets consistent with a media streaming protocol, wherein the one or more packets comprise the received media;

perform de-packetization of the received media, wherein the received media comprises video and audio;

apply a jitter buffer to the de-packetized received media;

perform reconstruction of the received media by performance of video and/or audio decoding on the received media; and copy the de-packetized and reconstructed received media after application of the jitter buffer to a destination memory.

10. The apparatus of claim 9, wherein the circuitry is accessible via a Peripheral Component Interconnect express (PCIe) interface.

11. The apparatus of claim 9, wherein the circuitry is to receive an initialization specifying one or more of: flow identifier of the one or more packets that comprise the received media, applied transmit protocol, video decoding to apply, audio decoding to apply, or destination address to store the received media.

12. The apparatus of claim 9, wherein the request comprises one or more of: a request to decode media and an address in memory to store the received media.

13. The apparatus of claim 9, wherein the circuitry is to provide an indication of packet receipt per frame or per stream.

14. The apparatus of claim 9, wherein the circuitry is to request a video decoder to decode the received media.

15. The apparatus of claim 9, comprising:

a server, wherein the server comprises a processor that is to execute a process that is to provide the request to perform de-packetization and reconstruction of received media from a transmitter and wherein the server comprises a memory device to store the received media.

16. At least one non-transitory computer-readable medium comprising instructions stored thereon, that if executed by one or more processors, cause the one or more processors to:

execute an operating system (OS) to:

configure circuitry of a network interface device to perform a request to perform media encoding and packetization prior to transmission of the media to a receiver, wherein:

the media comprises video and audio, the media encoding comprises performing applying a video and/or audio compression encoding on the media, and the network interface device comprises: a direct memory access (DMA) circuitry, a host interface, and a network interface to transmit and receive packets.

17. The at least one computer-readable medium of claim 16, wherein the request comprises one or more of: a request to encode media or a source memory address of the media.

18. The at least one computer-readable medium of claim 16, comprising instructions stored thereon, that if executed by one or more processors, cause the one or more processors to:

execute the OS to configure the circuitry of the network interface device to perform a second request to perform de-packetization and reconstruction of received media from a transmitter.

19. The at least one computer-readable medium of claim 18, wherein the second request comprises one or more of: a request to decode media and a memory address to store the decoded media.

20. The at least one computer-readable medium of claim 16, wherein the network interface device comprises one or more of: a network interface controller (NIC), a remote direct memory access (RDMA)-enabled NIC, SmartNIC, router, switch, forwarding element, infrastructure processing unit (IPU), or data processing unit (DPU).

* * * * *